June 7, 1932.  E. C. HORTON  1,861,698
WINDSHIELD CLEANER
Filed Aug. 24, 1926
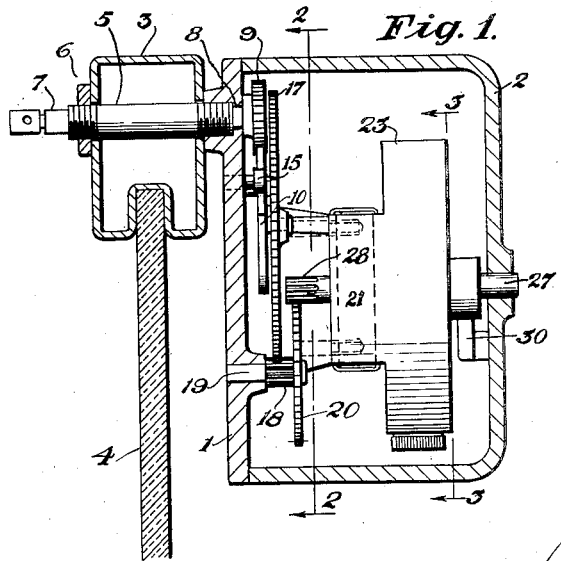
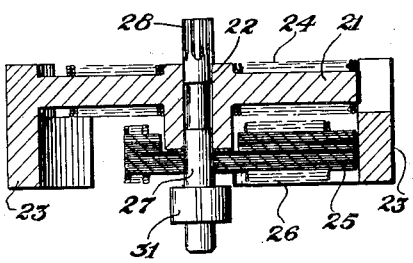
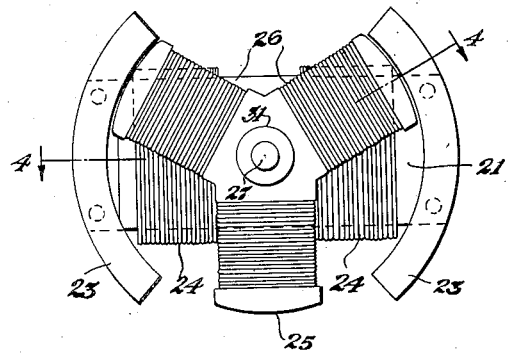
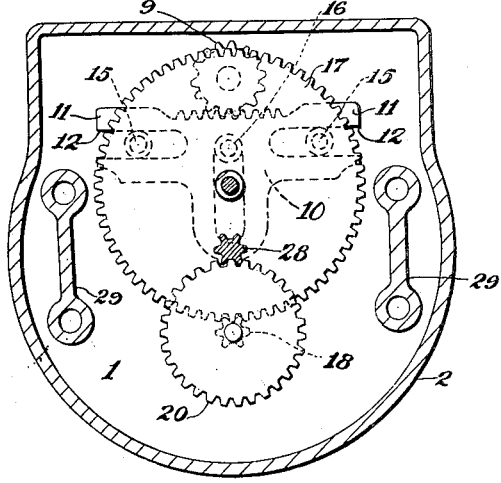
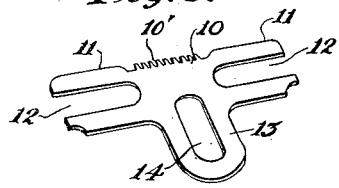
Inventor
Erwin C. Horton
by Barton A. Bean,
Atty.

Patented June 7, 1932

1,861,698

UNITED STATES PATENT OFFICE

ERWIN C. HORTON, OF HAMBURG, NEW YORK, ASSIGNOR TO TRICO PRODUCTS CORPORATION, OF BUFFALO, NEW YORK

WINDSHIELD CLEANER

Application filed August 24, 1926. Serial No. 131,190.

This invention relates to electrically operated windshield cleaners of the oscillatory or swinging type, wherein an electric motor is employed to drive the wiper operating shaft through the intermediary of a mechanical movement or transmission mechanism.

The invention has for an object to provide a compact arrangement of the motor and transmission mechanism which will occupy little space and may readily be mounted on the windshield frame. A further object of the invention is to provide an improved motor of more or less flat construction which may be disposed in a shallow space within the motor housing and which embodies a readily demountable armature that will operatively connect itself to the transmission mechanism upon being properly assembled relative to the field of the motor. A still further object is to provide an improved mechanical movement or transmission mechanism by which the rotary motion of the motor armature will be converted into oscillatory motion and transmitted to the wiper operating shaft.

In the drawing:

Fig. 1 is a vertical sectional view through the motor casing or housing, showing the interior workings in elevation.

Fig. 2 is a transverse vertical section on line 2—2 of Fig. 1 depicting more clearly the transmission mechanism.

Fig. 3 is a similar view on line 3—3 of Fig. 1 illustrating the motor in front elevation.

Fig. 4 is a cross section on line 4—4 of Fig. 3 further disclosing the construction of the motor, Fig. 5 is a detailed perspective view of the rack member employed in the transmission mechanism.

Referring more in detail to the accompanying drawing, the numeral 1 designates a supporting body member, which, in the present instance, constitutes the base of a housing or casing to which the cover or shell 2 is attached in any desired manner. The mounting of the casing on the windshield is herein depicted as being of the single hole type, wherein the upper frame bar 3 of the windshield 4 is provided with a single hole through which a mounting sleeve on the base 1 is projected, a nut 6 being applied to the projecting end of said sleeve for firmly clamping the frame bar 3 between the nut and the base. The wiper operating shaft 7 extends through this sleeve 5 and has journaled support in the base 1, as indicated at 8. The inner end of the shaft fixedly carries a pinion 9 for meshing with the teeth 10' of rack member 10 which latter is of special and peculiar formation, the same having end portions 11 extending in opposite directions from the body of the rack member, and each end portion is provided with a horizontal or longitudinal slot 12 herein shown as opening through the remote end thereof. The body or rack member 10 is provided with a stem 13 extending substantially at right angles from the rack teeth and being formed with a longitudinal slot 14. This construction provides a rack member which may be readily and economically stamped out of sheet metal, and the provision of slots 12 facilitates and expedites the mounting of the rack member on a pair of spaced guides or studs 15, which may be of integral formation, or of anti-frictional construction, such as rollers. Operating within the slot 14 of the rack member 10 is a crank pin 16 eccentrically carried by a large gear 17 which is journalled within the casing for intermeshing with a considerably smaller pinion or gear 18. This latter gear is mounted on a stub shaft 19 of the supporting body member 1 and is fixedly related to a relatively large gear 20 which is driven directly from the motor.

The motor is of such construction as to lie closely over the adjacent transmission to more or less house the same, and comprises a substantially flat field and a substantially flat armature or rotor shown as having three arms. The integral core 21 of the field or stator is elongated and substantially bar-like and, in addition, is formed with a centrally disposed shaft bearing 22 and terminal arcuate pole members 23, extending or offset to one side thereof but in concentric relation with bearing 22.

The field windings 24 are arranged on the flat body portion of the core between the terminal pole members 23 and the central bearing 22, as is clearly shown in Figs. 3 and 4. The field core is preferably an integral structure while the armature structure 25 is laminated, being composed of a series of metal plates around which the armature windings 26 extend. The innermost plates of the laminated body terminate short of the armature shaft 27 and thereby permits the use of a longer bearing 22 for said shaft, and a more compact motor assembly as shown in Fig. 4. The armature may be suitably attached to the shaft, as by being pressed thereon, and when in its operative position operates within and between the arcuate pole members 23. This construction and assembly provides a flattened motor construction of considerable force and power.

The inner end of the armature shaft projects to the rear of the field and has its periphery longitudinally cut to form gear teeth 28 for detachably intermeshing with the teeth of gear 20, by which arrangement the armature with its shaft may be readily displaced by an axial movement outwardly from the field member. In the present embodiment of the invention, the supporting body member 1 is provided with a pair of brackets or standards 29 for mounting the motor, the same having holes through which screws are passed for attaching the field core in position. These brackets serve as a sustaining spacer for the motor for supporting the same spaced from the adjacent face of the supporting body member and in front of the transmission mechanism. The motor being substantially flat, spreads itself over the underlying transmission and forms with the brackets a protective housing for the main portion of said transmission. The current of electricity may be supplied through brushes carried or mounted on said housing, of which one is shown at 30, wiping over a commutator 31 carried by the armature shaft 27. With the motor in operation, the rotary motion of the armature is transmitted through the speed reducing train of gears 28, 20, 18 and 17, and converted by the crank pin 16 and slot 14 into a reciprocatory motion for sliding the rack member back and forth at a relatively low speed. The reciprocatory movement to the rack member 10 is converted by the intermeshing rack teeth 10' and pinion 9 into an oscillatory motion for rocking the shaft 7. The rack member, being a thin, flat sheet metal stamping, occupies very little space behind the largest gear 17 so that the latter may be arranged in proximity to the face of the body member 1. The gear 20 extends between the gear 17 and the field member with its teeth projecting into the pitch line of the shaft teeth 28 so as to mesh with the latter when the armature is properly related to its field. By reason of the arrangement of the transmission parts and the embodiment of a flat type motor, it is possible to construct a light and compact electric windshield cleaner which will occupy a very small space when mounted on the windshield of a motor vehicle and which will not necessitate any cumbersome or special support for mounting same.

I claim as my invention:

1. A windshield cleaner comprising a supporting body member, a wiper shaft journalled therein and carrying a gear member, a pair of spaced guide studs projecting from the body member, a rack member meshing with the gear member and having end portions extending oppositely therefrom, an end portion being provided with a slot and receiving one of said guide studs for slidably supporting the rack member, said rack member having an elongated guide extending at an angle to the rack, and between said spaced studs, and driving means including a crank member engaging said elongated guide for reciprocating said rack member.

2. An electric windshield cleaner comprising a supporting body member having spaced brackets, a transmission mechanism arranged on said body member, an electric motor comprising a stator provided with a bearing and supported by the said brackets, a rotor mounted at one end in said bearing and having a pinion integral therewith, removably connected to and driving said transmission mechanism, and a housing provided with a bearing for journaling the other end of the rotor, said housing enclosing both the motor and transmission mechanism and being removably mounted on said supporting body.

3. An electric windshield cleaner comprising a supporting body member having spaced brackets, a transmission mechanism arranged on said body member, and an electric motor comprising a stator provided with a bearing and supported by the said brackets, and a rotor mounted at one end in said bearing and having a pinion integral therewith, removably connected to and driving said transmission mechanism, a housing provided with a bearing for journalling the other end of the rotor, said housing enclosing both the motor and transmission mechanism and being removably mounted on said supporting body, said housing removably maintaining said rotor assembly in operative position with the said transmission mechanism.

4. An electric windshield cleaner comprising, a supporting body member provided with raised brackets, a transmission mechanism arranged on said body member, an electric motor comprising a stator provided with a core having arcuate extensions and a central bearing, said stator being mounted on said brackets and above said transmission mechanism, a rotor provided with a rotor shaft having a drive pinion integral therewith on one end of said shaft, said drive pinion being insertable through said central bearing and thereby automatically connectible with said transmission mechanism, and a housing removably secured to said supporting body enclosing both the motor and the transmission mechanism, said housing journalling an end of said rotor shaft and retaining said rotor within said extensions of said stator.

ERWIN C. HORTON.